(12) United States Patent
Mosterman

(10) Patent No.: US 7,769,570 B2
(45) Date of Patent: Aug. 3, 2010

(54) HIERARCHICAL REFERENCES OR LINKS IN MODELING ENVIRONMENTS

(75) Inventor: Pieter J. Mosterman, Framingham, MA (US)

(73) Assignee: The MathWorks, Inc., Natick, MA (US)

( * ) Notice: Subject to any disclaimer, the term of this patent is extended or adjusted under 35 U.S.C. 154(b) by 329 days.

(21) Appl. No.: 11/820,154

(22) Filed: Jun. 18, 2007

(65) Prior Publication Data
US 2009/0013283 A1    Jan. 8, 2009

Related U.S. Application Data

(63) Continuation of application No. 10/748,064, filed on Dec. 29, 2003, now Pat. No. 7,337,102.

(51) Int. Cl.
*G06F 7/60* (2006.01)

(52) U.S. Cl. ............................................. 703/2; 703/21

(58) Field of Classification Search .................. 715/713, 715/808, 810, 817, 820, 841, 853, 854; 703/21
See application file for complete search history.

(56) References Cited

U.S. PATENT DOCUMENTS

| | | | | |
|---|---|---|---|---|
| 5,204,947 A | * | 4/1993 | Bernstein et al. ............ | 715/854 |
| 5,241,645 A | | 8/1993 | Cimral et al. | |
| 5,644,740 A | * | 7/1997 | Kiuchi ....................... | 715/853 |
| 5,805,167 A | * | 9/1998 | van Cruyningen .......... | 715/808 |
| 5,926,180 A | * | 7/1999 | Shimamura ................. | 715/739 |
| 6,002,398 A | * | 12/1999 | Wilson ........................ | 715/777 |
| 6,336,123 B2 | * | 1/2002 | Inoue et al. ................. | 715/206 |
| 6,348,935 B1 | | 2/2002 | Malacinski et al. | |
| 6,381,611 B1 | * | 4/2002 | Roberge et al. ........... | 707/104.1 |
| 6,621,532 B1 | * | 9/2003 | Mandt ........................ | 348/841 |
| 6,684,255 B1 | * | 1/2004 | Martin ....................... | 709/231 |
| 6,983,227 B1 | | 1/2006 | Thalhammer-Reyero | |
| 6,986,120 B2 | | 1/2006 | Reddy et al. | |
| 7,024,631 B1 | | 4/2006 | Hudon et al. | |
| 7,076,453 B2 | | 7/2006 | Jammes et al. | |
| 7,242,413 B2 | * | 7/2007 | Chu et al. ................... | 345/619 |
| 2002/0029231 A1 | * | 3/2002 | Aptus et al. ................. | 707/513 |
| 2005/0066771 A1 | | 3/2005 | Margaria | |

FOREIGN PATENT DOCUMENTS

WO    WO-99/27443 A1    6/1999

OTHER PUBLICATIONS

Rational Rose® RealTime, "Toolset Guide," Rational Software Corporation, pp. 1-492 (2002).

* cited by examiner

*Primary Examiner*—Paul L Rodriguez
*Assistant Examiner*—Aniss Chad
(74) *Attorney, Agent, or Firm*—Lahive & Cockfield, LLP; Kevin J. Canning

(57) ABSTRACT

Methods and systems for making a reference to a resource in modeling environments are disclosed. The resource to which the reference is made includes the data of the system designed and/or executed in the modeling environments. The system includes subsystems and hierarchical references are made to the data of the subsystems. In response to users' action to select one of the hierarchical references to the resource, the hierarchical references included in the selected hierarchical reference are provided to users so that the users may navigate the data of the subsystems and select one of the subsystems. If users activate the selected hierarchical reference, the data corresponding to the selected hierarchical reference is retrieved and provided to the users.

10 Claims, 11 Drawing Sheets

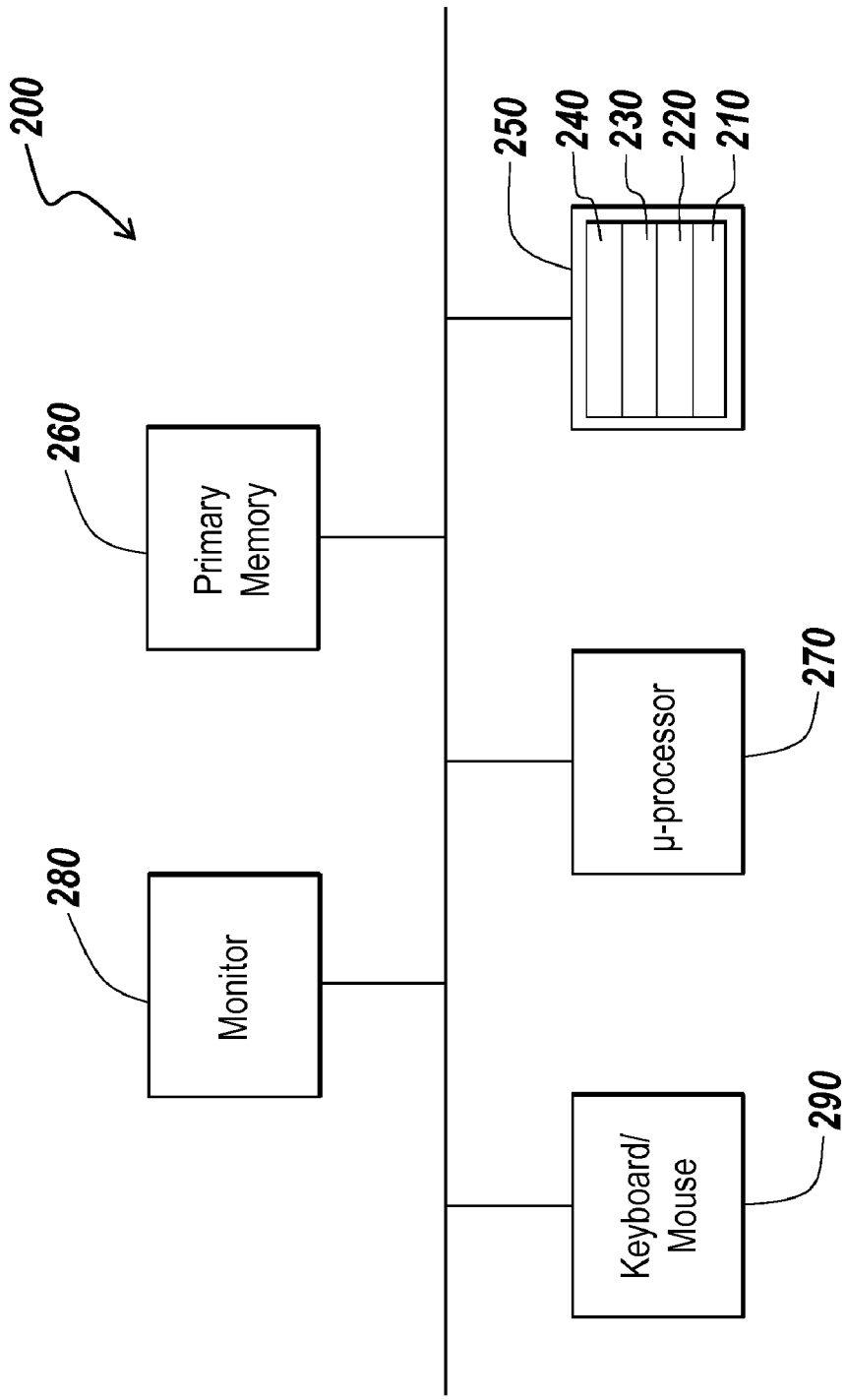

HIERARCHICAL REFERENCES OR LINKS IN MODELING ENVIRONMENTS

RELATED APPLICATION

This application claims the benefit of U.S. patent application Ser. No. 10/748,064 filed on Dec. 29, 2003, the contents of which are hereby incorporated by reference. This application is related to the International Patent Application Ser. No. PCT/US2004/043774 filed on Dec. 29, 2004.

FIELD OF THE INVENTION

The present invention relates generally to modeling environments and more particularly to methods for providing hierarchical references or links to resources in the modeling environments.

BACKGROUND OF THE INVENTION

Various classes of block diagrams describe computations that can be performed on application specific computational hardware, such as a computer, microcontroller, FPGA, and custom hardware. Classes of such block diagrams include time-based block diagrams, such as those found within Simulink®, from The MathWorks, Inc. of Natick, Mass., state-based and flow diagrams, such as those found within Stateflow®, from The MathWorks, Inc. of Natick, Mass., and data-flow diagrams. A common characteristic among these various forms of block diagrams is that they define semantics on how to execute the diagram.

Historically, engineers and scientists have utilized time-based block diagram models in numerous scientific areas such as Feedback Control Theory and Signal Processing to study, design, debug, and refine dynamic systems. Dynamic systems, which are characterized by the fact that their behaviors change over time, are representative of many real-world systems. Time-based block diagram modeling has become particularly attractive over the last few years with the advent of software packages, such as Simulink®. Such packages provide sophisticated software platforms with a rich suite of support tools that makes the analysis and design of dynamic systems efficient, methodical, and cost-effective.

A dynamic system (either natural or man-made) is a system whose response at any given time is a function of its input stimuli, its current state, and the current time. Such systems range from simple to highly complex systems. Physical dynamic systems include a falling body, the rotation of the earth, bio-mechanical systems (muscles, joints, etc.), bio-chemical systems (gene expression, protein pathways), weather and climate pattern systems, etc. Examples of man-made or engineered dynamic systems include: a bouncing ball, a spring with a mass tied on an end, automobiles, airplanes, control systems in major appliances, communication networks, audio signal processing, nuclear reactors, a stock market, etc. Professionals from diverse areas such as engineering, science, education, and economics build mathematical models of dynamic systems in order to better understand system behavior as it changes with the progression of time. The mathematical models aid in building "better" systems, where "better" may be defined in terms of a variety of performance measures such as quality, time-to-market, cost, speed, size, power consumption, robustness, etc. The mathematical models also aid in analyzing, debugging and repairing existing systems (be it the human body or the anti-lock braking system in a car). The models may also serve an educational purpose of educating others on the basic principles governing physical systems. The models and results are often used as a scientific communication medium between humans. The term "model-based design" is used to refer to the use of block diagram models in the development, analysis, and validation of dynamic systems.

The modeling and execution environments may employ hyperlinks to make references to resources including the data of the systems designed and/or executed using the modeling and execution tools. Hyperlinks are one of the technologies that provide references to resources without making a copy of the resources. Hyperlinks provide active references to resources. The active references enable users to retrieve the referenced resources. The resources may be of many types including Hypertext Markup Language (HTML) pages, Microsoft Word™ documents, Adobe Postscript™ documents, and directory listings. Hyperlinks are a convenient mechanism in electronic resources for providing active references.

In conventional modeling and execution environments, hyperlinks rely on a flat organization of data in the referenced resource, which means that each of the hyperlinks provides a reference to a single resource. Furthermore, the flat organization of data in the conventional modeling and execution environments is unwieldy and not efficient, especially if the amount of the data in the referenced resource is large. Accordingly, there is a need for a system that provides efficient references to resources that have a large amount of data.

SUMMARY OF THE INVENTION

The present invention provides methods for making references or links to resources in modeling and execution environments. The present invention provides references or links to the data of the system designed and/or executed in the modeling and execution environments. The referenced data of the system includes different kinds of data on the system, which may be described as a horizontal hierarchy. The different kinds of the data may include block data, coverage report data, requirements data, generated code data, etc. In connection with the references, the present invention may provide a user interface that displays options for users to select one of the different kinds of the data on the system. The options to select one of the different kinds of data on the system enable the users to consider the system from many different viewpoints.

The present invention may also provide references to each kind of data on the system in a hierarchical manner, which may be described as a vertical hierarchy. The system includes sub-nodes that correspond to the subsystems of the system. In connection with the references, the present invention may provide a user interface that displays the sub-nodes of the system so that the users may navigate the sub-nodes and select one of the sub-nodes. If the users activate the selected node, the data corresponding to the subsystem is retrieved and provided to the users.

The present invention may also provide a user interface that displays options to select a super-node of the system corresponding to a super-system that includes the system. The super-system includes the system as one of its subsystems and is hierarchically in a higher level than the system. If users select the options, the super-node is provided to users so that the users may navigate to the sub-nodes of the super-node and select one of the sub-nodes of the super-node.

In an illustrative embodiment of the present invention, a method is provided for providing a resource with a reference to a system in an electronic device that runs a software tool for design and execution of the system. The system has different kinds of data, such as the requirements document and generated code of the system. The resource is provided with a visual reference that the system is referenced by the resource. In response to an action taken by users in connection with the visual reference, a user interface provided to display options to select one of different kinds of data on the system so that the users navigate the different kinds of data on the system.

In another illustrative embodiment of the present invention, a method is provided for providing a resource with a reference to the system in an electronic device that runs a software tool for design and execution of the system. The resource is provided with a visual reference that the system is referenced by the resource. In response to an action taken by users in connection with the visual reference, a user interface is provided to display sub-nodes of the referenced system so that the users navigate the sub-nodes of the referenced system to select one of the sub-nodes, wherein the sub-nodes are hierarchically structured and correspond to subsystems of the referenced system.

In still another illustrative embodiment of the present invention, a method is provided for providing a resource with a reference to a first system in an electronic device that runs a software tool for system level design and execution of the first system. The first system is a subsystem of the second system. The resource is provided with a visual reference that the first system is referenced by the resource. In response to an action taken by users in connection with the visual reference, a user interface is presented to enable users to navigate to the second system, wherein the second system is hierarchically structured and in a higher level than the first system.

By providing a hierarchical reference to the data of the system designed and/or executed in the modeling and execution environments, the present invention enables users to select one of the different kinds of data on the system. This enables users to consider the system from many different viewpoints. In addition, the hierarchical reference to each kind of the data on the system enables efficient references to the data of the system that has a large amount of data.

BRIEF DESCRIPTION OF THE DRAWINGS

The aforementioned features and advantages, and other features and aspects of the present invention, will become better understood with regard to the following description and accompanying drawings, wherein:

FIG. 2 is a block diagram representation of an electronic device suitable for practicing the illustrative embodiment of the present invention;

DETAILED DESCRIPTION

The illustrative embodiment of the present invention concerns a modeling and execution tool running on an electronic device. The modeling and execution tools of the illustrative embodiment generate resources, such as reporting documents, that include a reference to the system designed and/or executed using the modeling and execution tools. One of skill in the art will appreciate that the reference to the system is illustrative and the reference can be made to other resources, such as files and directories. The system referenced has a horizontal hierarchy and includes different kinds of data on the system. The illustrative embodiment of the present invention provides a user interface in connection with the reference to the system. The user interface displays the different kinds of data on the system so that users may select one kind of the data. The display of the horizontal hierarchy of the referenced system in the user interface enables users to consider the system from many different viewpoints.

In the illustrative embodiment of the present invention, the system referenced also has a vertical hierarchy and is represented by nodes that correspond to the subsystems of the referenced system. The illustrative embodiment of the present invention provides another user interface in connection with the reference to the system. The user interface displays the hierarchically structured nodes of the referenced system so that users may navigate the subsystems of the referenced system and select one of the subsystems. If the users select one of the subsystems, the data corresponding to the selected subsystem is retrieved and provided to the users. The display of the hierarchically structured nodes of the referenced system in the user interface enables users to access the data of the referenced system in a more efficient manner.

The illustrative embodiment of the present invention employs hyperlinks to provide references to the systems designed and/or executed in the modeling and execution environments. Hyperlinks are one of the technologies for providing references to resources without making a copy of the resources. The hyperlinks enable users to retrieve the referenced resource. Hyperlinks are a convenient mechanism in electronic resources as it allows active references. One of skill in the art will appreciate that the hyperlinks are an illustrative embodiment of the present invention and do not limit the scope of the present invention. Rather, the present invention may be applicable to any reference that enables users to retrieve referenced resources.

Figure 1:
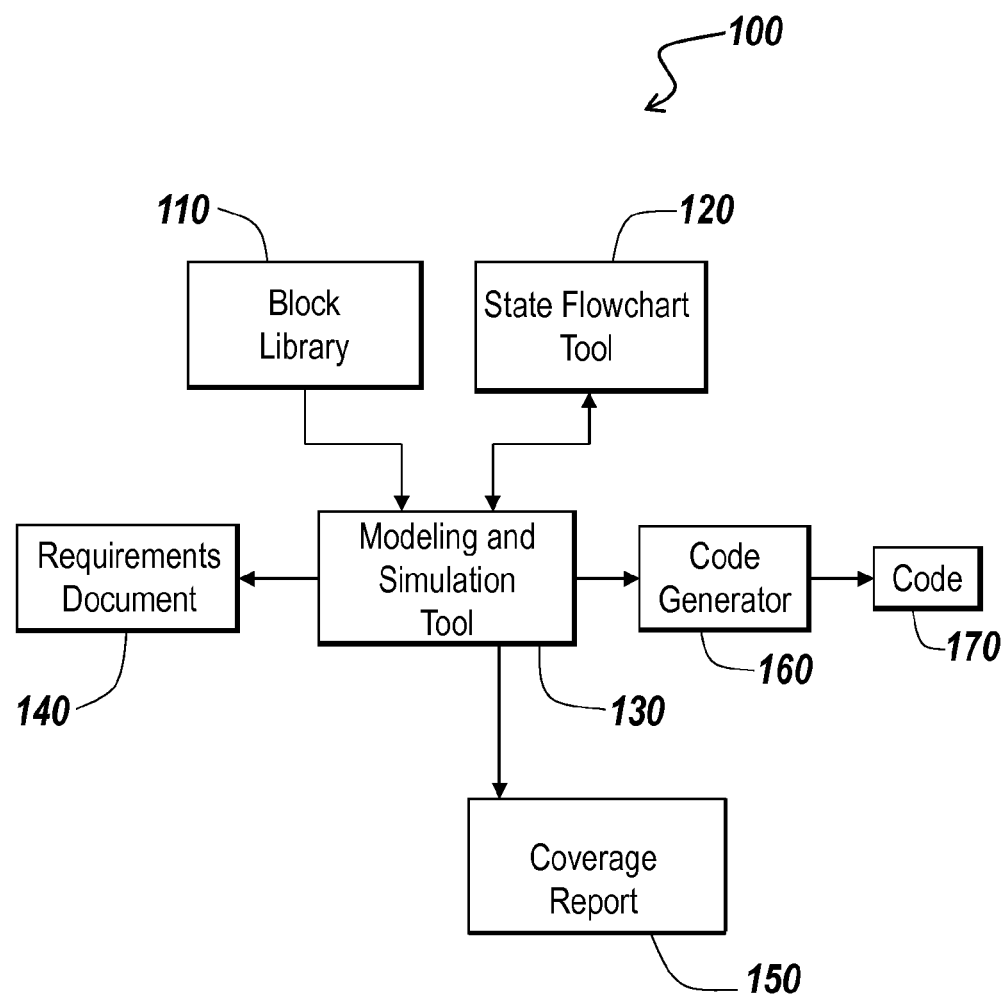
FIG. 1 is a block diagram representation of an exemplary modeling and execution environment that generates resources making references or links to systems in the illustrative embodiment of the present invention.

FIG. 1 is an exemplary modeling and execution environment 100 suitable for practicing the illustrative embodiment of the present invention. The system 100 includes a block library 110, a state flowchart tool 120, a modeling and execution tool 130, a requirements document 140, a coverage report 150, a code generation tool 160 and generated code 170. One of skill in the art will appreciate that the modeling and execution environment 100 is not limited to graphical modeling and execution environments, but rather includes any other modeling and execution environments, such as textual modeling and execution environments.

The block library 110 contains blocks of application specific models that support the modeling and execution of systems. The blocks in the block library 110 are incorporated into the block diagrams of the systems designed using the modeling and execution tool 130. The blocks provided from the block library 100 are represented in rectangular blocks in the illustrative embodiment of the present invention. One of skill in the art will appreciate that the blocks in the block library 110 can be represented in other graphical symbols or textual symbols. An illustrative embodiment of the block library 110 may be found in Simulink Blocksets, such as the Aerospace Blockset and the DSP (Digital Signal Processing) Blockset, from The MathWorks, Inc. of Natick, Mass. The Blocksets provide models and utilities for the development and integration of models for systems and sub-systems of the systems. The blocks used in modeling the systems may be built on native Simulink® blocks or S-functions which enable users to define the blocks that can operate in the Simulink® environment. S-functions written in C-code, for example, are compiled using the MEX command in MATLAB® to make a file that is executable in the Simulink® environment.

The state flowchart tool 120 provides a graphical environment for modeling and designing event-driven systems. The state flowchart tool 120 enables users to generate state flowcharts that graphically represent hierarchical and parallel states and the event-driven transitions between the states of the systems. Based on the state flowcharts created in the state flowchart tool 120, the modeling and execution tool 130 executes the systems and analyzes the behavior of the systems. In the modeling and execution tool 130, the state flowcharts may exchange data, signals, and events with other state flowcharts. Stateflow® from The MathWorks, Inc. of Natick, Mass., is an example of the state flowchart tool 120.

The modeling and execution tool 130 provides a graphical execution and prototyping environment for modeling, executing, and analyzing systems. The block diagrams of the systems are designed and executed in the modeling and execution tool 130 using the model blocks provided from the block library 110 or the state flowcharts provided from the state flow tool 120. Simulink®, from The MathWorks, Inc. of Natick, Mass., is an exemplary modeling and execution tool 130. Those skilled in the art will appreciate that other modeling and execution tools may be used. The Blockset operates in Simulink®. Stateflow® is integrated with Simulink®, which enables each of the state flowcharts to be represented as its own block.

Simulink® enables users to design a block diagram of systems, execute the systems' behavior, analyze their performance, and refine the design. Simulink® allows users to design systems through a user-interface that allows drafting block diagrams of the systems. All of the blocks in the block library 110 are available to users when the users are building the block diagram of the systems. Individual users may be able to customize the blocks to: (a) reorganize blocks in some custom format, (b) delete blocks they do not use, and (c) add custom blocks they have designed. The blocks may be dragged through some human-machine interface (such as a mouse or keyboard) from the block library 110 on to the window (i.e., model canvas). Simulink® includes a block diagram editor that allows users to perform such actions as draw, edit, annotate, save, and print out block diagram representations of systems. The block diagram editor is a graphical user interface (GUI) component that allows drafting of block diagram models by users. In Simulink®, there is also a textual interface with a set of commands that allow interaction with the graphical editor. Using this textual interface, users may write special scripts that perform automatic editing operations on the block diagram. Simulink® also allows users to execute the designed systems to determine the behavior of the systems. Simulink® includes a block diagram execution engine that carries out the task of compiling and linking the block diagram to produce an "in-memory executable" version of the model that is used for generating code and/or executing a block diagram model.

The modeling and execution tool 130 also facilitates the requirements document 140 for the design and execution of the systems. The requirements document 140 may be in Microsoft Word™ documents or Microsoft Excel™ documents, or HTML (Hypertext Markup Language) documents. The requirements document 140 sets forth restrictions or requirements for the design of the systems. The requirements document may be associated with a node that represents a subsystem in the tree of the systems. Multiple requirements documents may be associated with a single node in the tree. A requirement document may be added to any node in the hierarchical tree of the system. After adding a requirement to a node, the requirements document may be changed.

The coverage report 150 shows which functionality of the system is executed in the simulations of the system. System analysis generally relies on performing a large number of simulations that attempt to cover the operational envelope of the system under scrutiny. The input for each of the simulations is chosen such that critical points of the operational envelope are tested, as such, each of the input sets is referred to as a test vector. To confirm that the test vectors cover the operational envelope, the coverage report 150 shows which functionality of the system model has been executed. This ensures that the correctness of the functionality that is conditionally executed is indeed tested for at least one of the test vectors.

The code generation tool 160 generates customizable C code 170 directly from the block diagrams for rapid prototyping, hardware-in-the-loop executions, and desktop rapid execution. In the illustrative embodiment of the present invention, the system designed and/or executed in the environment 100 may be linked with multiple data including the block diagram, coverage report 150, requirements document 140 and generated code 170 of the system. One of skill in the art will appreciate that the block diagram, coverage report 150, requirements document 140 and generated code 170 are illustrative data linked with the system and the system may be linked with any other kinds of data.

FIG. 2 is a block diagram representation of an electronic device 200 suitable for practicing the illustrative embodiment of the present invention. The electronic device 200 includes a secondary memory 250, a primary memory 260, a microprocessor 270, a monitor 280 and a keyboard/mouse 290. The microprocessor 270 controls each component of the electronic device 200 to run the software tools in the modeling and execution environment 100 properly. The electronic device 200 receives the data necessary for the design and execution of a system through the keyboard/mouse 290, such as the requirements document 140. The electronic device 200 displays in the monitor 280 the data generated in the modeling and execution environment 100, including the block diagram and the generated code 170. The primary (working) memory 260 fetches from the secondary (storage) memory 250 and provides to the microprocessor 270 the codes that need to be accessed by the microprocessor 270 to operate the electronic device 200 and to run the modeling and execution environment 100. The secondary memory 250 usually contains software tools for applications. The secondary memory 250 includes, in particular, code 210 for the block library 110, code 220 for the state flow tool 120, code 230 for the modeling and execution tool 130, and code 240 for the code generation tool 160.

Figure 3A:
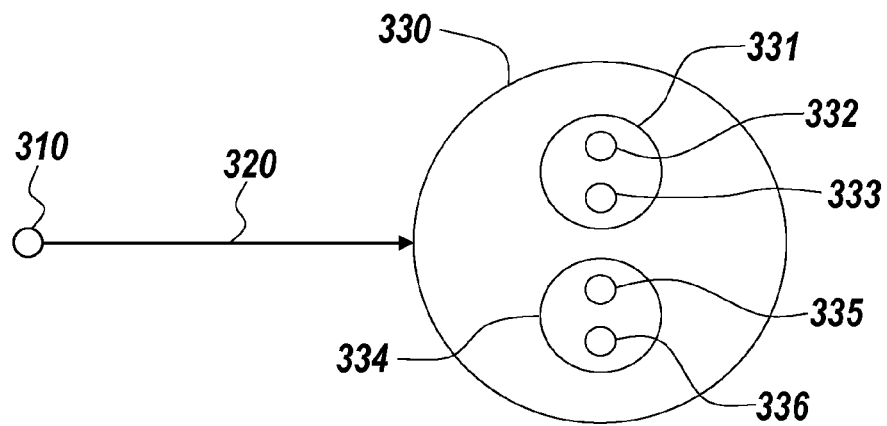
FIGS. 3A and 3D are exemplary node representation of the hyperlink employed in the illustrative embodiment of the present invention.

FIG. 3A is an exemplary node representation of the hyperlink employed in the illustrative embodiment of the present invention. The hyperlink has the structure of a directed graph that includes a referencing node 310, a referenced node 330 and a link 320. The referencing node 310 represents a resource that makes a reference and the referenced node 330 represents a resource that is referenced. In the illustrative embodiment, the referenced node 330 represents the data of the system designed and/or executed in the modeling and execution environment 100. One of skill in the art will appreciate that the resources referenced may include other resources, such as text files and directories. The hyperlink may be associated to any part of the data of the system referenced. The referenced system is hierarchically structured and the node 330 may have one or more sub-nodes 331-336 that correspond to subsystems of the referenced system. The nodes 331 and 334 are the sub-nodes of the node 330. The nodes 332-333 and 335-336 are sub-nodes of the nodes 331 and 334, respectively. The nodes 331-336 can be referenced as part of the node 330. In the illustrative embodiment of the present invention, each of the contained nodes (for example, nodes 332 and 333) can be referenced from a containing node (for example, node 331). One of skill in the art will appreciate that the hierarchical structure of the referenced system depicted in FIG. 3A is illustrative and the system may have a different hierarchical structure.

Figure 3B:
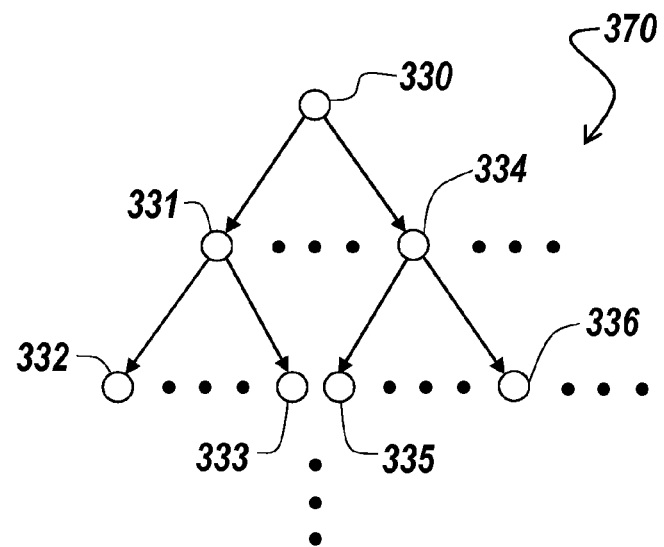
FIGS. 3B and 3C are exemplary node representations of the hierarchical structure of the referenced system in the illustrative embodiment of the present invention.

FIG. 3B is a representation 370 of the vertical hierarchy of the referenced system in the illustrative embodiment of the present invention. The node representation 370 shows a hierarchical tree structure of the referenced system depicted in FIG. 3A. The node 330 represents the referenced system and the arrows indicate that the nodes 331 and 334 are the sub-nodes of the node 330. The nodes 332-333 and 335-336 are sub-nodes of the nodes 331 and 334, respectively. The selection of a sub-node is described below in more detail in connection with FIGS. 5A and 7A. One of skill in the art will appreciate that the number of sub-nodes is not limited to two and the sub-nodes of a node may be more than two.

Figure 3C:
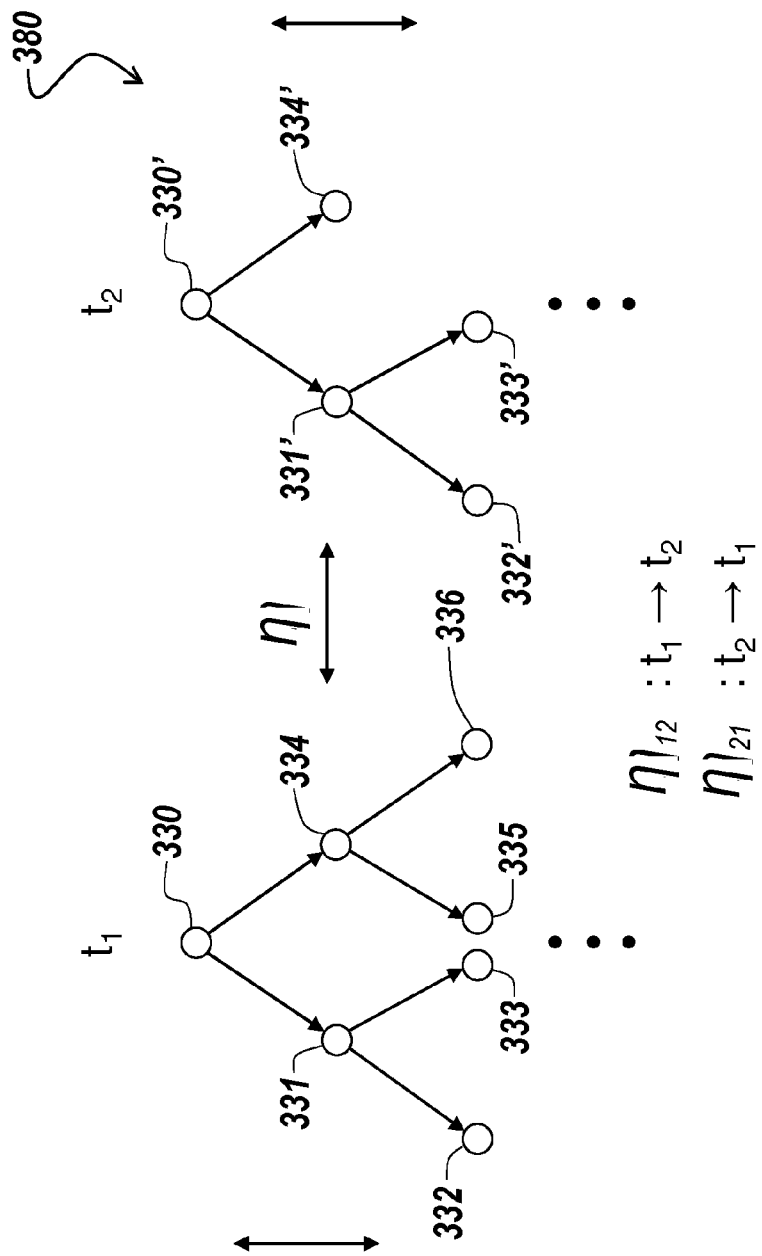

FIG. 3C is a representation 380 of the horizontal hierarchy of the referenced system in which two tree structures t1 and t2 represent different kinds of data on the referenced system. For example, the referenced system may be associated with the data of the block diagram and generated code of the system. Thus, the first and second tree structures t1 and t2 originated from the nodes 330 and 330' may represent the block diagram data and the generated code data of the referenced system, respectively. One of skill in the art will appreciate that the trees t1 and t2 in the horizontal hierarchy of the referenced system may represent another data of the system, such as data for the requirements document of the referenced system. One of skill in the art will also appreciate that the number of the trees in the horizontal hierarchy is not limited to two and can be extended to more than two depending on how many different kinds of data are associated to the referenced system. In addition, one of skill in the art will further appreciate that each of the trees may have different structure than other trees. In the horizontal hierarchy structures 380, users may select one of the tree structures representing the different kinds of data on the referenced system. Therefore, the users may shift from a current tree to another tree by mapping m12:t1→t2 or m21:t2→t1, as shown in FIG. 3C. The selection of a tree structure is described below in more detail in connection with FIGS. 7B and 7D.

Figure 3D:
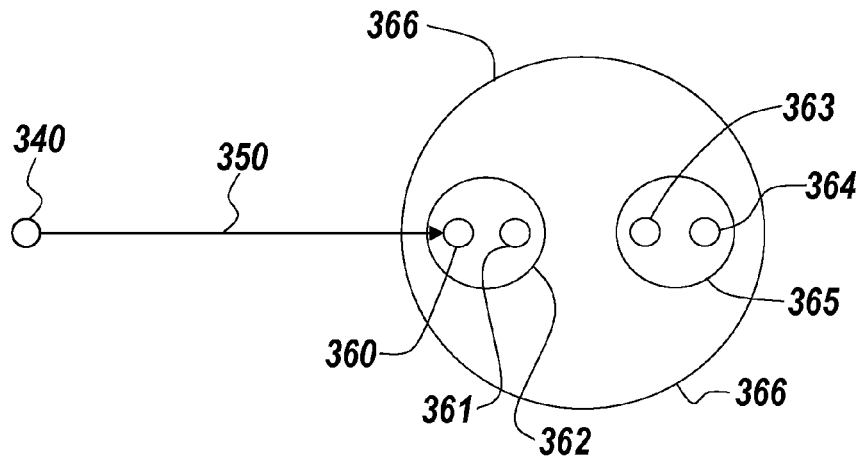

FIG. 3D is another exemplary node representation of the hyperlink in the illustrative embodiment of the present invention. The hyperlink includes nodes 340 and 360 and a link 350. The nodes 340 and 360 represent a resource that makes a reference, and a system that is referenced, respectively. The node 360 representing the referenced system is included in the super-nodes 362 and 366 that are hierarchically in a higher level than the referenced node 360. The super-nodes 362 and 366 that contain the referenced node 360 represent super-systems that include the referenced system. The nodes 362 and 366 can be referenced from the reference node 360. Other contained nodes (for example, node 365) can be referenced from a containing node (for example, node 366). The selection of a super-node is described below in more detail in connection with FIG. 7C.

Figure 4A:
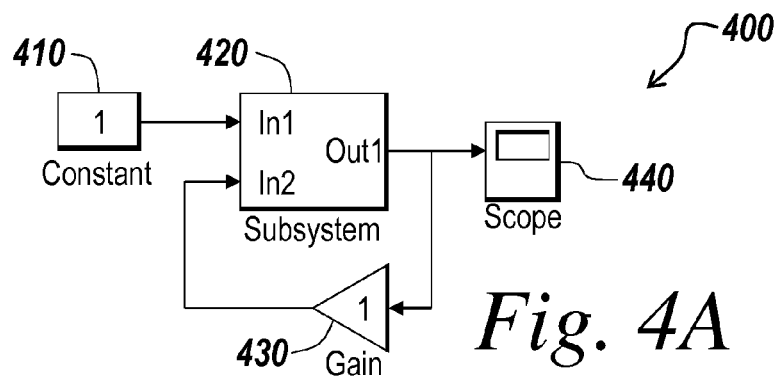
FIG. 4A is a block diagram representation of an exemplary model for a system designed in the modeling and execution environment of the illustrative embodiment of the present invention depicted in FIG. 1.
Figure 4B:
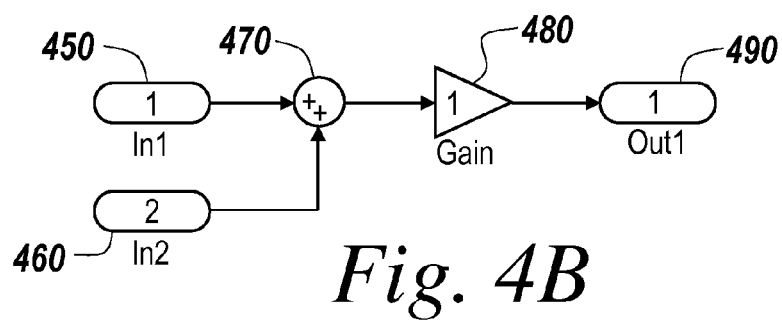
FIG. 4B is a block diagram representation of an exemplary model for a subsystem of the system in the illustrative embodiment of the present invention depicted in FIG. 1.

FIG. 4A is a block diagram representation of an exemplary system 400 designed in the modeling and execution environment 100 in the illustrative embodiment of the present invention. The system 400 includes Constant block 410, Subsystem block 420, Gain block 430 and Scope block 440. The Constant block 410 is connected to the first input of the Subsystem block 420. The Subsystem block 420 generates an output that is fed back through the Gain block 430 to the second input of the Subsystem block 420. The Scope block 440 is used to visualize the output of the Subsystem block 420. The internals of the Subsystem block 420 are shown in FIG. 4B. The Subsystem block 420 includes Sum block 470 that sums the first input 450 and the second input 460, and Gain block 480. The Subsystem contains an algebraic loop because the second input 470 of the Subsystem block 420 is algebraically related to the output of the Subsystem 420. So, in order to compute the output of the Subsystem block 420, the input 470 of the Subsystem 420 has to be known, which requires the output of the Subsystem 420 to be known. Algebraic loops may arise for many reasons and are not considered problematic in some domains (such as, e.g., plant modeling). However, in other domains (e.g., embedded control design) algebraic loops indicate an anomalous design. In case of the latter, it is desired to report the presence of an algebraic loop as an error and abort further analysis or execution.

Figure 5A:
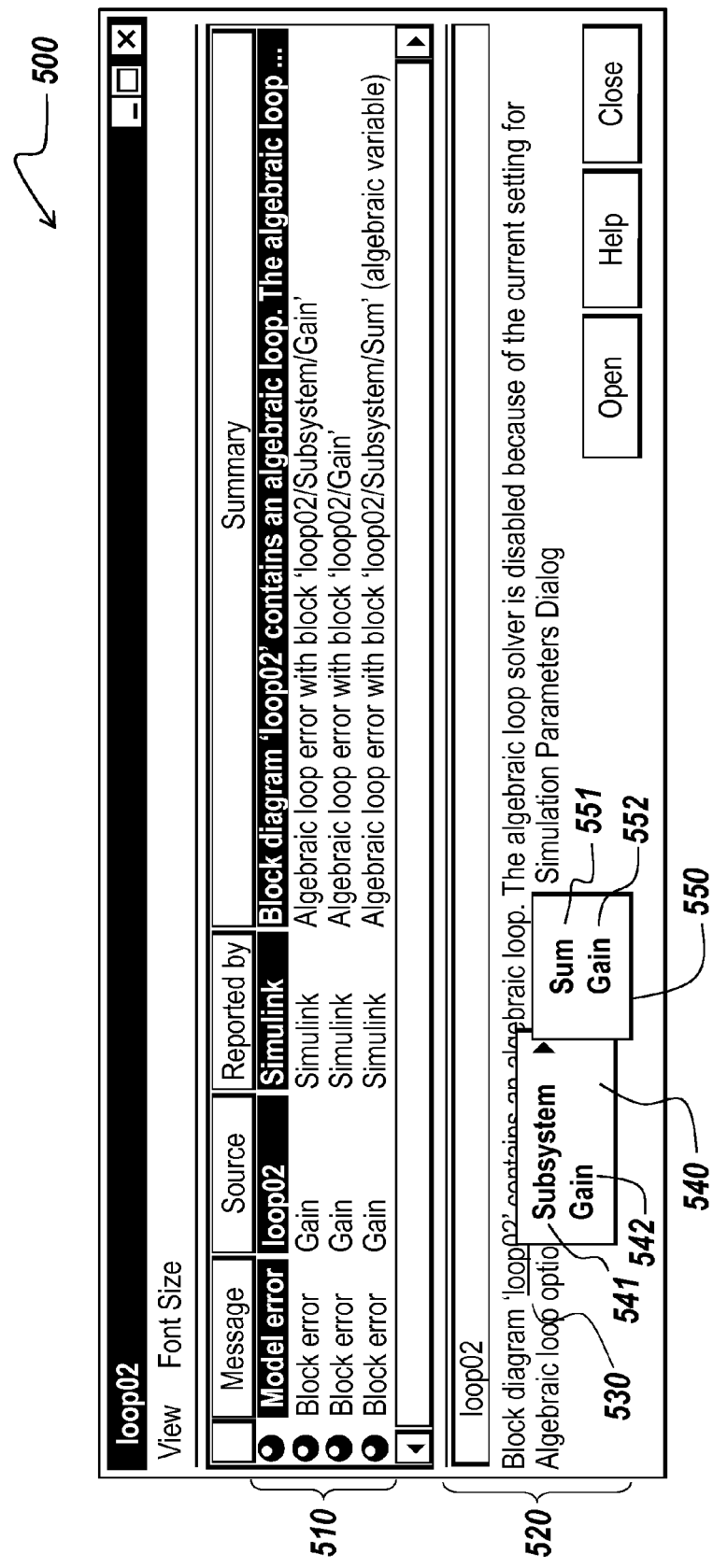
FIG. 5A is an exemplary resource that reports algebraic loop errors in the model depicted in FIG. 4A-4B.
Figure 5B:
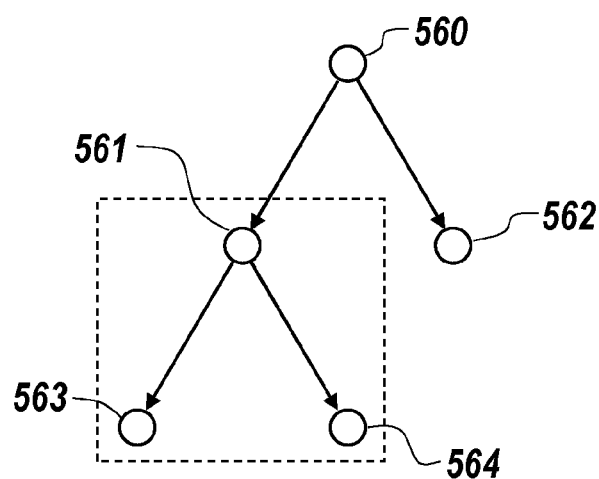
FIG. 5B is an exemplary node representation of the 'loop02' system referenced in the error message depicted in FIG. 5A.

FIG. 5A shows an exemplary error report 500 for the algebraic loop in FIG. 4A in the illustrative embodiment of the present invention. The report 500 lists all blocks 510 involved in the algebraic loop. If users select one of the blocks in the list, a more elaborate error message is displayed in the bottom pane 520 of the window. This message may include a hyperlink 530 to the selected block in the actual model of the system. In FIG. 5A, 'loop02' is selected in the list and referenced in the error message. The hyperlink 530 is underlined. If the users select the hyperlink 530 with the index button of the pointing device 290, a user interface 540 is provided to display Subsystem 541 and Gain 542 that correspond to the Subsystem block 420 and the Gain block 430 of the 'loop02' system. In the illustrative embodiment, the user interface 540 is provided in a pop-up menu. If the users select the Subsystem 541 in the user interface 540, another user interface 550 is provided for displaying Sum 551 and Gain 552 that correspond to the Sum block 470 and the Gain block 480, respectively. The user interfaces 540 and 550 provide all of the sub-nodes of the 'loop02' system so that users may navigate the sub-nodes of the 'loop02' system and easily come to one of the sub-nodes. FIG. 5B is an exemplary node representation of the 'loop02' system referenced in the error message depicted in FIG. 5A in the illustrative embodiment of the present invention. The node 560 represents the 'loop02' algebraic loop system and includes sub-nodes 561 and 562 that correspond to the Subsystem block 420 and the Gain block 430, respectively. The node 561 includes sub-nodes 563 and 564 that correspond to the Sum block 470 and the Gain block 480, respectively. The hierarchical node structure depicted in FIG. 5B matches with the display provided in the user interfaces 540 and 550 in FIG. 5A. The illustrative embodiment of the present invention implements the direct mapping between the hierarchy of the referenced system and the hierarchical hyperlink to the referenced system.

In order to allow users to access a hierarchical hyperlink by executing one simple user interface, the user interface may be provided by selecting a meta-key in the keyboard 290 before invoking the regular activation. After the users select one of the hyperlinks provided in the user interface, the hyperlinks contained in the selected hyperlink may in turn be made available through the same mechanism. For example, the shift or control key can be pressed in combination with clicking the index button on the pointing device 290 to access the user interface provided in a hierarchical pop-up menu. The pop-up menu may also be provided when the button is depressed longer than needed to activate the 'click' call-back or when the pointing device 290 is moved over the hyperlink. The inputs from the users through the keyboard/pointing device 290 are sent to the microprocessor 270 which determines whether the users select a hyperlink. When determining that the users select a hyperlink, the microprocessor 270 runs code for the hierarchical hyperlinks of the selected hyperlink to provide the hierarchical hyperlinks of the selected hyperlink in the user interface. An exemplary HTML code for hierarchical hyperlinks is provided below with reference to FIG. 7A. The pop-up menu would contain the hierarchy of hyperlinks contained by the selected node. Alternatively, hierarchical hyperlinks can be individually marked to either allow direct activation or always requiring a hierarchical selection (e.g., in case the link is a 'virtual' grouping of others).

Figure 6A:
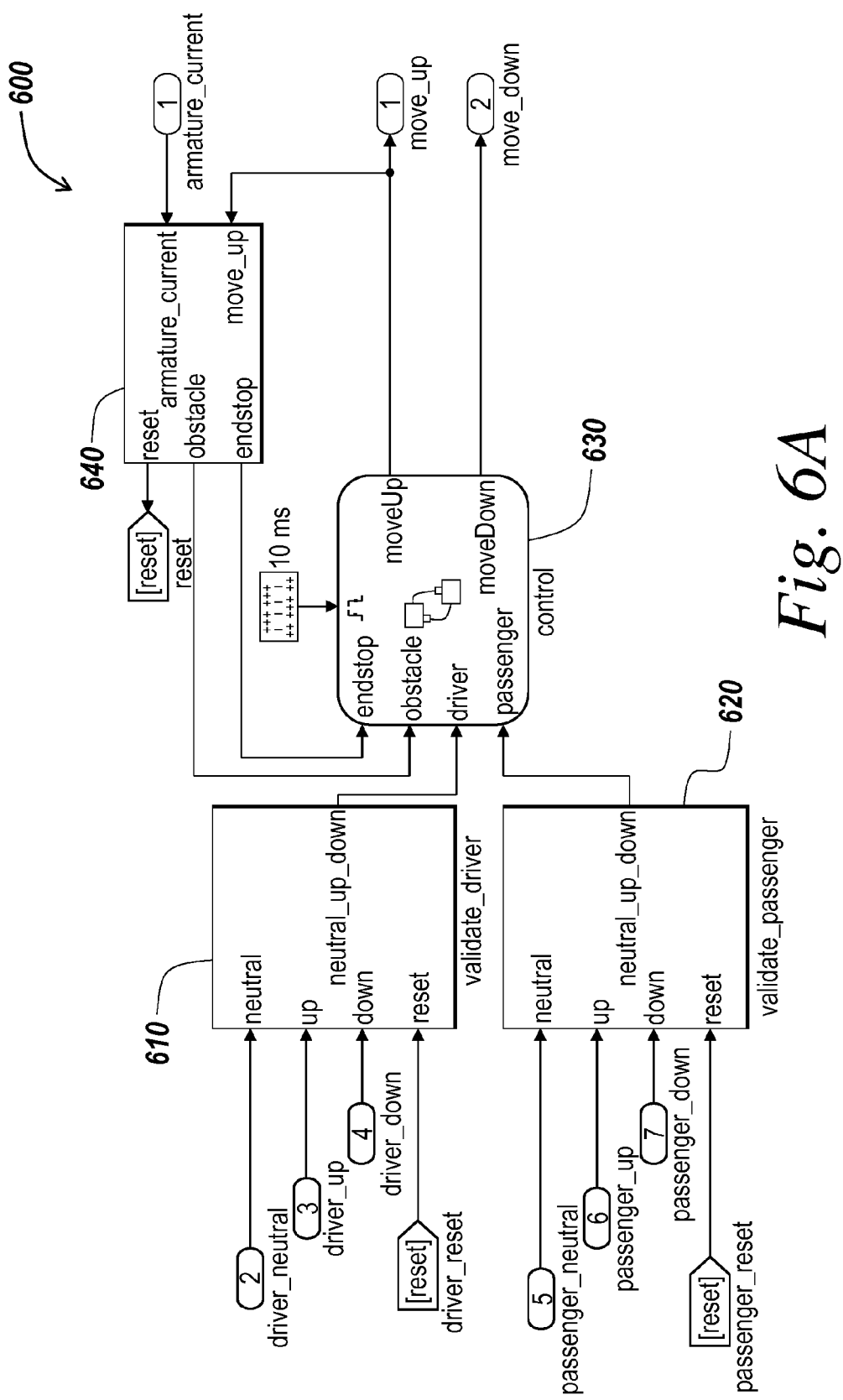
FIG. 6A is a block diagram representation of an exemplary model for a system and subsystem designed in the modeling and execution environment of the illustrative embodiment of the present invention depicted in FIG. 1.
Figure 6B:
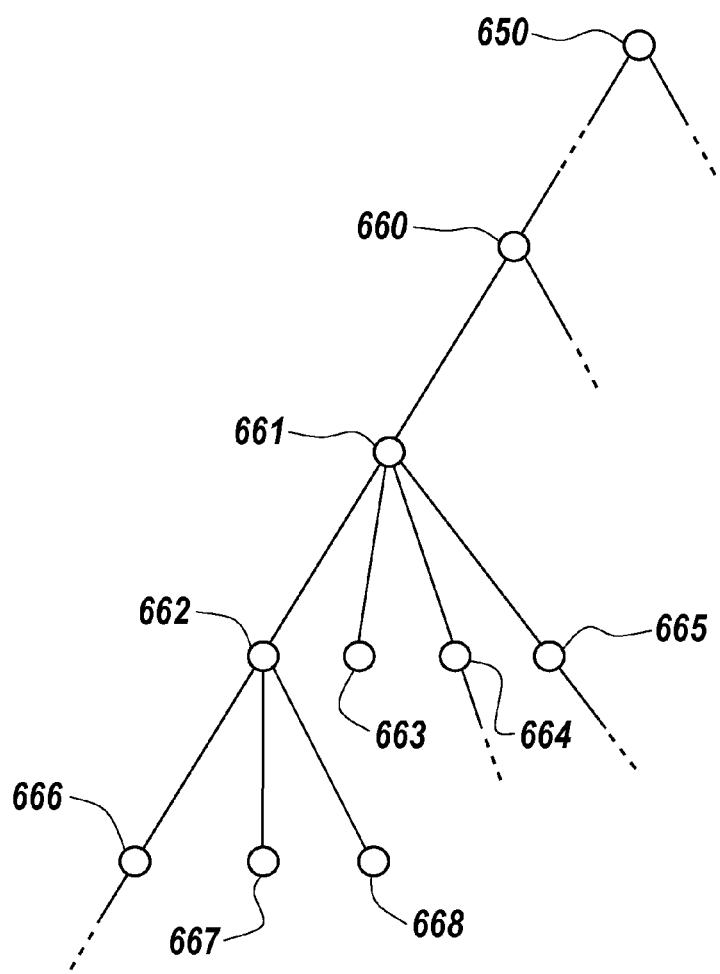
FIG. 6B is an exemplary node representation of a motor vehicle model that may include the power window control system shown in FIG. 6A.

FIG. 6A is a block diagram representation of another exemplary system 600 designed in the modeling and execution environment 100 in the illustrative embodiment of the present invention. The system 600 implements a power window control system for motor vehicles, which includes validate_driver block 610, validate-passenger block 620, control block 630 and detect_obstacle_endstop block 640. The validate_driver block 610 and validate-passenger block 620 receive inputs for moving the windows of motor vehicles from drivers and passengers, respectively. The detect_obstacle_endstop block 640 detects obstacles in moving the windows, and the upper end-stop of the windows. The control block 630 outputs signals for moving up and down the windows based on the input signals from the validate_driver block 610, validate-passenger block 620 and detect_obstacle_endstop block 640. FIG. 6B is an exemplary node representation of a motor vehicle model that may include the power window control system 600 shown in FIG. 6A in the illustrative embodiment of the present invention. The node 650 in a highest level may represent the motor vehicle that may have a plurality of subsystems including a power window system represented by the node 660. The node 661, which is one of the sub-nodes of the node 660, represents the power window control system 600. The nodes 662-665, which are sub-nodes of the node 661, correspond to the validate_driver block 610, validate-passenger block 620, control block 630 and detect_obstacle_endstop block 640. The node 662 representing the detect_obstacle_endstop block 640 includes sub-nodes 666-668 corresponding to the process_current block, detect_obstacle block and detect_endstop block (not shown in FIG. 6A).

Figure 7A:
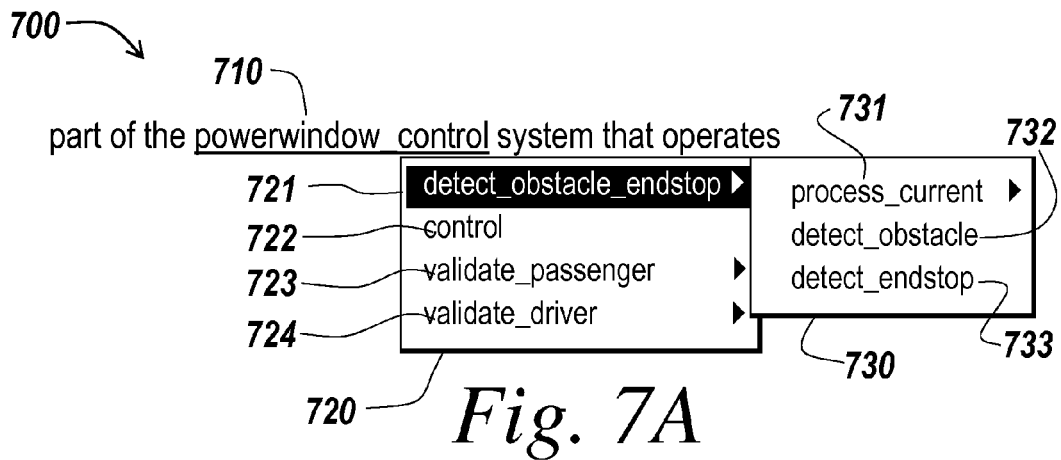
FIG. 7A is an exemplary resource that include a hyperlink to the power window control system depicted in FIG. 6A.

FIG. 7A is an exemplary resource 700 that includes a hyperlink 710 to the power window control system 600 depicted in FIG. 6. The hyperlink 710 included in the resource 700 is underlined. If users select the hyperlink 710 with a pointing device 290, a user interface is provided to display the detect_obstacle_endstop 721, control 722, validate-passenger 723 and validate_driver 724, which correspond to the detect_obstacle_endstop block 640, control block 630, validate-passenger block 620 and validate_driver block 610 of the system 600, respectively. If the users select the detect_obstacle_endstop 721 in the user interface 720, another user interface 730 is provided for displaying the sub-nodes of the detect_obstacle_endstop 721, that is, process_current 731, detect_obstacle 732 and detect_endstop 733. If the users select the process_current 731 in the user interface 730, a subsequent user interface may be provided for displaying the sub-nodes of the process_current 731. One of skill in the art will appreciate that the options provided in the user interface 730 may be provided in the form of a drop down or pull down menu associated with the representation of the detect_obstacle_endstop 721. The user interfaces 720 and 730 provide the sub-nodes of the system 600 so that users may navigate the nodes and easily come to a subsystem of the system 600. The hierarchical node structure depicted in FIG. 6B matches with the display provided in the user interfaces 720 and 730 in FIG. 7A. The illustrative embodiment of the present invention implements the direct mapping between the hierarchy of the referenced system and the hierarchical hyperlink to the referenced system.

Code for the references provided in the user interfaces 720 and 730 may be implemented in Hypertext Markup Language (HTML), Extensible Markup Language (XML), or any other languages that provide a function to make a reference to another resource, such as JavaScript. In an illustrative embodiment of the present invention, the contained nodes are precompiled in the referencing document and marked accordingly. In another illustrative embodiment of the present invention, the contained nodes may be dynamically retrieved from the referencing node. An exemplary HTML code using an 'a hhref' tag to indicate hierarchical references shown in FIG. 7A is provided as follows.

part of the

```
<a href="powerwindow/powerwindow_control_system">
<a hhref="powerwindow/powerwindow_control_system/detect_obstacle_endstop" label=" detect_obstacle_endstop">
<a hhref="powerwindow/powerwindow_control_system/detect_obstacle_endstop/process_current" label="process_current">
<a hhref="powerwindow/powerwindow_control_system/detect_obstacle_endstop/process_current/absolute_value"
```

```
label="absolute_value"></a>
<a hhref="powerwindow/powerwindow_control_system/detect_obstacle_endstop/process_current/scale_daq"
label="scale_daq"></a>
</a>
<a hhref="powerwindow/powerwindow_control_system/detect_obstacle_endstop/detect_obstacle"
label="detect_obstacle"></a>
<a hhref="powerwindow/powerwindow_control_system/detect_obstacle_endstop/detect_endstop"
label="detect_endstop"></a>
</a>
<a hhref="powerwindow/powerwindow_control_system/control" label=" control"></a>
<a hhref="powerwindow/powerwindow_control_system/validate_passenger" label="validate_passenger">
<a hhref="powerwindow/powerwindow_control_system/validate_passenger/check_up" label="check_up"></a>
<a hhref="powerwindow/powerwindow_control_system/validate_passenger/check_down" label="check_down"></a>
<a hhref="powerwindow/powerwindow_control_system/validate_passenger/mutually_exclusive"
label="mutually_exclusive"></a>
</a>
<a hhref="powerwindow/powerwindow_control_system/validate_driver" label="validate_driver">
<a hhref="powerwindow/powerwindow_control_system/validate_driver/check_up" label="check_up"></a>
<a hhref="powerwindow/powerwindow_control_system/validate_driver/check_down" label="check_down"></a>
<a hhref="powerwindow/powerwindow_control_system/validate_driver/mutually_exclusive"
label="mutually_exclusive"></a>
</a>
powerwindow_control_system</a> that operates
```

Figure 7B:
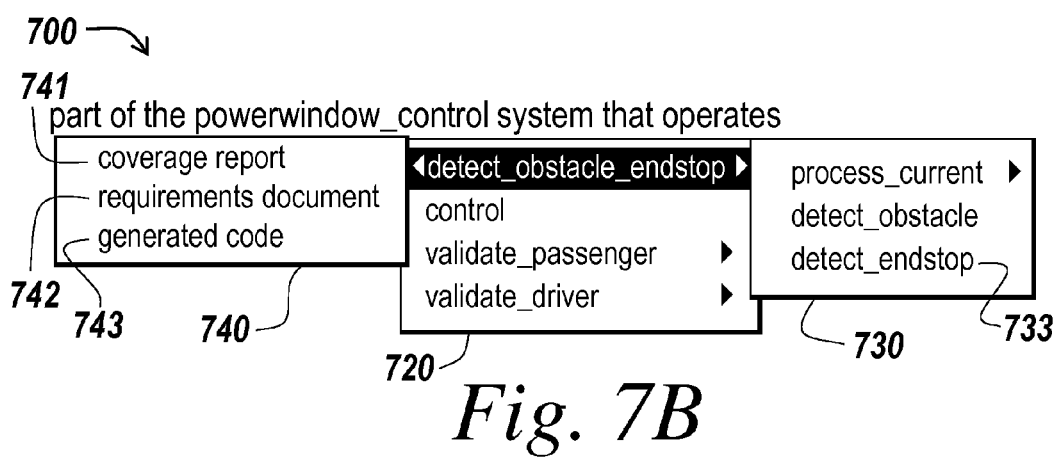
FIG. 7B depicts another user interface that provides horizontal hierarchy of the system depicted in FIG. 6A.
Figure 7C:
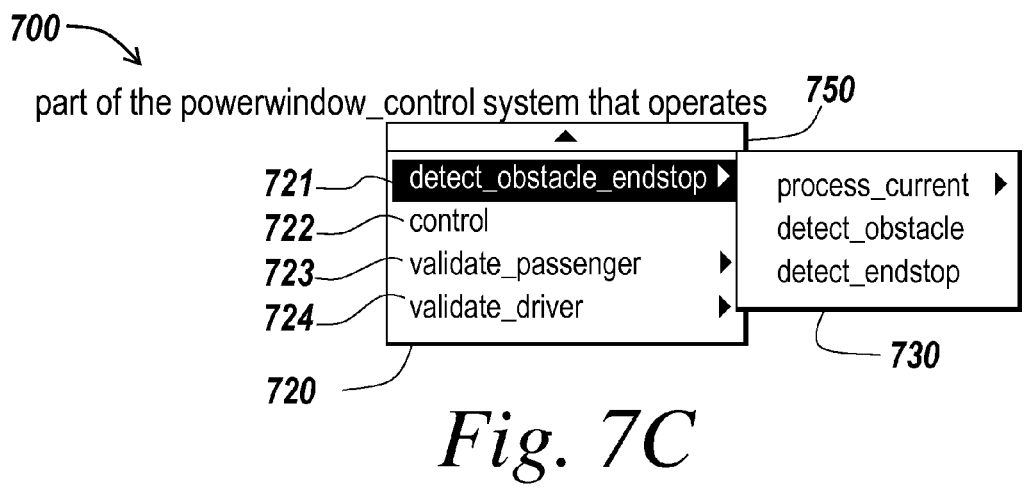
FIG. 7C depicts another user interface that provides an option for users to select a super-node of the system depicted in FIG. 6A.

FIG. 7B depicts another user interface 740 that provides horizontal hierarchy of the system 600. The user interface 720 provides the nodes of the system 600 for users to select, which includes the detect_obstacle_endstop 721, control 722, validate-passenger 723 and validate_driver 724. If the users select the detect_obstacle_endstop option in the user interface 720, additional user interface 740 is provided for displaying options to select different kinds of data on the detect_obstacle_endstop block 640, which include coverage report 741, requirements document 742 and generated code 743. One of skill in the art will appreciate that the different kind of data depicted in FIG. 7B is illustrative and may include any kind of data that is linked with the detect_obstacle_endstop block 640. If the users select one of the options 741-743, the selected data on the detect_obstacle_endstop is retrieved and provided to the users. FIG. 7C depicts another user interface 750 that provides an option for users to select a super-node of the system 600. The user interface 720 provides the nodes of the system 600 for users to select, which includes the detect_obstacle_endstop 721, control 722, validate-passenger 723 and validate_driver 724. An additional user interface 750 provides additional options for users to go to an upper level of nodes, for example, the node 760 representing a power window system. Therefore, if users select the up arrow 750 in the pop-up menu, the users may access the power window system that is in a higher level than the power window control system 600.

Figure 7D:
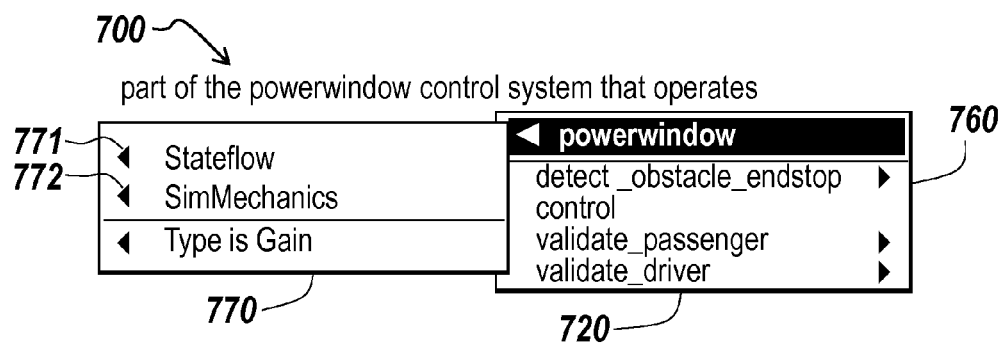
FIG. 7D depicts another user interface that provides horizontal hierarchy of the system depicted in FIG. 6A.

FIG. 7D depicts another user interface 770 that provides horizontal hierarchy of the system 600. The user interface 720 provides the nodes of the system 600 for users to select, which includes the detect_obstacle_endstop 721, control 722, validate-passenger 723 and validate_driver 724. The user interface 720 includes an additional node 760 that corresponds to the power window control system 600. If the users select the power window 760 in the user interface 720, additional user interface 770 is provided for displaying options to select different types of power window control system implemented in different design environments, such as Simulink®, Stateflow®, SimMechanics, etc. The user interface 720 refers to the block diagram of the power window control system 600, which is implemented in Simulink®. The additional user interface 770 includes options for selecting power window control systems implemented in Stateflow® 771 and SimMechanics 772. One of skill in the art will appreciate that Stateflow® 771 and SimMechanics 772 are illustrative and the user interface may includes options to select any design environment. Furthermore, the user interface may include an option for user entered selection, for example, all blocks of type 'Gain,' as shown in FIG. 7D. An exemplary HTML code using an 'a bhref' tag to indicate hierarchical references shown in FIG. 7D is provided as follows.

part of the

```
<a href="powerwindow/powerwindow_control_system">
<a href="" label="powerwindow">
<a bhref="" label="Stateflow">
<a bhref=" powerwindow/powerwindow_control_system/control" label="control"</a>
<a bhref="powerwindow/powerwindow_control_system/detect_obstacle_endstop/detect_obstacle/delay_detection"
label="delay_detection"</a>
</a>
<a bhref="" label="SimMechanics">
<a bhref="powerwindow/window_system/process/plant/window/door" label="door"</a>
<a bhref="powerwindow/window_system/process/plant/window/ window" label="window"</a>
<a bhref="powerwindow/window_system/process/plant/window/ rotate_and_slide" label="rotate and slide"</a>
</a>
<hr>
<a bhref="" label="Type is Gain">
<a bhref="powerwindow/window_system/process/plant/window/force" label="force"</a>
```

-continued

```
<a hhref="powerwindow/window_system/process/plant/window/torque" label="torque"></a>
</a>
</a>
<hr>
<a hhref="powerwindow/powerwindow_control_system/detect_obstacle_endstop" label=" detect_obstacle_endstop">
<a hhref="powerwindow/powerwindow_control_system/detect_obstacle_endstop/process_current"
label="process_current">
<a hhref="powerwindow/powerwindow_control_system/detect_obstacle_endstop/process_current/absolute_value"
label="absolute_value"></a>
<a hhref="powerwindow/powerwindow_control_system/detect_obstacle_endstop/process_current/scale_daq"
label="scale_daq"></a>
</a>
<a hhref="powerwindow/powerwindow_control_system/detect_obstacle_endstop/detect_obstacle" label="
detect_obstacle"></a>
<a hhref="powerwindow/powerwindow_control_system/detect_obstacle_endstop/detect_endstop" label="
detect_endstop"></a>
</a>
<a hhref="powerwindow/powerwindow_control_system/control" label=" control"></a>
<a hhref="powerwindow/powerwindow_control_system/validate_passenger" label="validate_passenger">
<a hhref="powerwindow/powerwindow_control_system/validate_passenger/check_up" label="check_up"></a>
<a hhref="powerwindow/powerwindow_control_system/validate_passenger/check_down" label="check_down"></a>
<a hhref="powerwindow/powerwindow_control_system/validate_passenger/mutually_exclusive"
label="mutually_exclusive"></a>
</a>
<a hhref="powerwindow/powerwindow_control_system/validate_driver" label="validate_driver">
<a hhref="powerwindow/powerwindow_control_system/validate_driver/check_up" label="check_up"></a>
<a hhref="powerwindow/powerwindow_control_system/validate_driver/check_down" label="check_down"></a>
<a hhref="powerwindow/powerwindow_control_system/validate_driver/mutually_exclusive"
labeh="mutually_exclusive"></a>
</a>
powerwindow control system</a> that operates
```

In summary, the illustrative embodiment of the present invention provides hierarchical hyperlinks to data. The hyperlinked data is organized hierarchically so that it can be easily accessed by users. For these purposes, the illustrative embodiment of the present invention provides user interfaces to display the hierarchical structure of the hyperlinked data. The users can navigate the hyperlinked data and select a portion of the hyperlinked data in the hierarchical structure. The illustrative embodiment of the present invention also provides the user interface element with options to select one of different kinds of data in the horizontal hierarchy of the hyperlinked data, such as block diagram data and the generated code data. Therefore, users can look at the linked data from many different viewpoints. Furthermore, the illustrative embodiment of the present invention provides the user interface with an option for users to access data that is hierarchically in a higher level than the hyperlinked data.

It will thus be seen that the invention attains the objectives stated in the previous description. Since certain changes may be made without departing from the scope of the present invention, it is intended that all matter contained in the above description or shown in the accompanying drawings be interpreted as illustrative and not in a literal sense. For example, the illustrative embodiment of the present invention may be practiced in any other modeling and execution environment that provides active references to resources. Practitioners of the art will realize that the sequence of steps and architectures depicted in the figures may be altered without departing from the scope of the present invention and that the illustrations contained herein are singular examples of a multitude of possible depictions of the present invention.

I claim:

1. A physical computer-readable medium storing computer-executable instructions that are executed on a processing device, the medium storing:
one or more instructions for displaying at least a portion of a block diagram of an executable model of a dynamic system on a display device, the block diagram of the executable model comprising one or more blocks arranged in one or more levels according to an internal hierarchy of the block diagram of the executable model;
one or more instructions for displaying a graphical representation of the internal hierarchy of the block diagram of the executable model on the display device, the graphical representation representing the internal hierarchy of the block diagram of the executable model with one or more icons;
one or more instructions for selecting one of the one or more icons that reference the level;
one or more instructions for accessing the selected one of the one or more levels of the block diagram of the executable model through the graphical representation;
one or more instructions for receiving a first input;
one or more instructions for selecting a first block of the block diagram of the executable model on the graphical representation based on the received first input; and
one or more instructions for receiving a second input.

2. The physical medium of claim 1, wherein at least one icon references each level.

3. The physical medium of claim 1, wherein the one or more blocks are displayed with corresponding names on the graphical representation.

4. The physical medium of claim 1, wherein the graphical representation indicates a functional relationship among the one or more blocks of the block diagram of the executable model.

5. The physical medium of claim 4, wherein the functional relationship among the one or more blocks of the block diagram of the executable model is indicated by a visual reference on the graphical representation.

6. The physical medium of claim 1, further storing:
one or more instructions for displaying the one or more paths with a visual reference on the graphical representation.

7. The physical medium of claim 1, accessing further storing:

one or more instructions for activating one of the one or more icons on the graphical representation using an input device to display one or more blocks represented by the activated icon on the display device.

8. A physical computer-readable medium storing computer-executable instructions that are executed on a processing device, the medium storing:

one or more instructions for displaying a first block diagram of an executable model of a dynamic system or a textual description related to the first block diagram of the executable model, the first block diagram of the executable model comprising one or more blocks arranged in one or more hierarchical levels;

one or more instructions for displaying a list of resources associated with the first block diagram of the executable model or the textual description related to the first block diagram of the executable model on a user interface, one or more instructions for providing access to resources associated with a second block diagram of an executable model of a dynamic system in a higher level than the first block diagram of the executable model;

one or more instructions for receiving an input to select a resource from the list of resources;

one or more instructions for retrieving the selected resource from a storage location in response to the input; and one or more instructions for displaying the selected resource on the user interface.

9. The physical medium of claim 8, wherein resources corresponding to one or more blocks in a same hierarchical level are displayed in one of a same row or a same column of the user interface.

10. The physical medium of claim 8, wherein the resources comprise one or more of generated code, a requirements document or a coverage report.

* * * * *

UNITED STATES PATENT AND TRADEMARK OFFICE
CERTIFICATE OF CORRECTION

PATENT NO.        : 7,769,570 B2                                           Page 1 of 1
APPLICATION NO.   : 11/820154
DATED             : August 3, 2010
INVENTOR(S)       : Pieter J. Mosterman It is certified that error appears in the above-identified patent and that said Letters Patent is hereby corrected as shown below:

At column 14, line 49 (claim 1), please delete "and" after "input".

At column 14, line 50 (claim 1), please delete "." after "input".

At column 14, line 50 (claim 1), please insert --; one or more instructions for selecting a second block of the block diagram of the executable model on the graphical representation based on the received second input, the second block reachable from the first block via one or more paths; and one or more instructions for displaying the one or more paths from the first block to the second block-- after "input".

Signed and Sealed this

Second Day of November, 2010

David J. Kappos
*Director of the United States Patent and Trademark Office*